United States Patent [19]

Bette et al.

[11] 4,426,997
[45] Jan. 24, 1984

[54] SOLAR ENERGY PANEL

[76] Inventors: Joseph A. Bette; William A. Bette, Both of Rte. 172; James R. Bette, Kettletown Woods Rd., all of Southbury, Conn. 06488

[21] Appl. No.: 193,709

[22] Filed: Oct. 3, 1980

[51] Int. Cl.³ ............................................. F24J 3/02
[52] U.S. Cl. .................................. 126/445; 126/429; 126/448; 165/170
[58] Field of Search ............................. 126/429–431, 126/436, 444–446, 448–450; 165/170, 166; 52/553

[56] References Cited

U.S. PATENT DOCUMENTS

| | | | |
|---|---|---|---|
| 807,642 | 12/1905 | Sides et al. | 126/444 |
| 1,996,808 | 4/1935 | Heitman | 165/170 |
| 2,108,795 | 2/1938 | Budd | 165/170 |
| 4,000,850 | 1/1977 | Diggs | 126/431 |
| 4,076,013 | 2/1978 | Bette | 126/431 |
| 4,134,389 | 1/1979 | McClintock | 165/170 |
| 4,184,476 | 1/1980 | McArthur | 126/429 |
| 4,265,221 | 5/1981 | Whennery | 126/429 |
| 4,296,741 | 10/1981 | Harder | 126/450 |

FOREIGN PATENT DOCUMENTS 7712931  6/1979  Sweden ........................ 126/445

Primary Examiner—Lee E. Barrett
Attorney, Agent, or Firm—Curtis, Morris & Safford

[57] ABSTRACT

A solar heating panel utilizing an improved panel member construction to increase the strength and heat transfer capacity of the panel. The panel has upper and lower layers of individual interconnected panel members, with the panel members in the upper layer including a pair of spaced outwardly extending leg portions and a bight portion therebetween having a plurality of spaced longitudinal fins formed therein extending downwardly into the panel members of the lower layer. A sheet of transparent material overlies the upper layer of panel members. Air flowing in the channels of the lower layer of panel members absorbs heat collected from the sun in the upper layer of panel members, with the fins aiding in transferring heat from the panel members in the upper layer to the panel members in the lower layer, while rigidifying the entire panel structure.

22 Claims, 9 Drawing Figures

SOLAR ENERGY PANEL

The present invention relates to a solar heating panel, and in particular to a panel formed of individual generally channel shaped channel members.

U.S. Pat. No. 4,076,013 discloses a solar heating system for a building using a stressed skin panel construction formed of one or more layers of channel shaped beam members. As disclosed in that patent solar heat is collected in the upper layer of beam or panel elements, while air is passed through channels defined in the lower layer of beam members to collect heat absorbed in the upper layer and transfer that heat to a storage area such as a rock bed or the like. That solar heating construction has been found to be highly satisfactory in use and can, in fact, serve as a structural portion of the building in which it is used. That is, it can serve as the roof element for the building.

It is an object of the present invention to provide an improved panel construction for a solar heating system of the type disclosed in U.S. Pat. No. 4,076,013.

A further object of the present invention is to provide a solar heating panel having improved heat transfer ability.

Yet another object of the present invention is to provide an improved solar heating panel which has improved heat transfer capacity as well as increased strength.

In accordance with an aspect of the present invention a solar heating panel is provided that includes, in one embodiment, upper and lower layers of panel elements. Each layer is formed of a plurality of panel elements, members or beams having a generally U or channel shaped cross-section including a pair of spaced legs and a bight portion. The panel members of the upper layer have a plurality of fins formed in their bight portions extending downwardly, in a direction opposite to the panel members' legs, into channels defined by the lower panel members. Preferably, these fins have a height which is sufficient to engage the bight portion of the lower panels to aid in heat transfer while rigidifying the entire structure. These fins may be deformed or shaped, as described hereinafter, to provide for increased turbulence in the air flowing within the channels of the lower panel members to produce a greater amount of heat transfer from the upper solar heat absorbing layer.

The above, and other objects, features and advantages of this invention will be apparent in the following detailed description of illustrative embodiments thereof, which is to be read in connection with the accompanying drawings, wherein.

Figure 1:
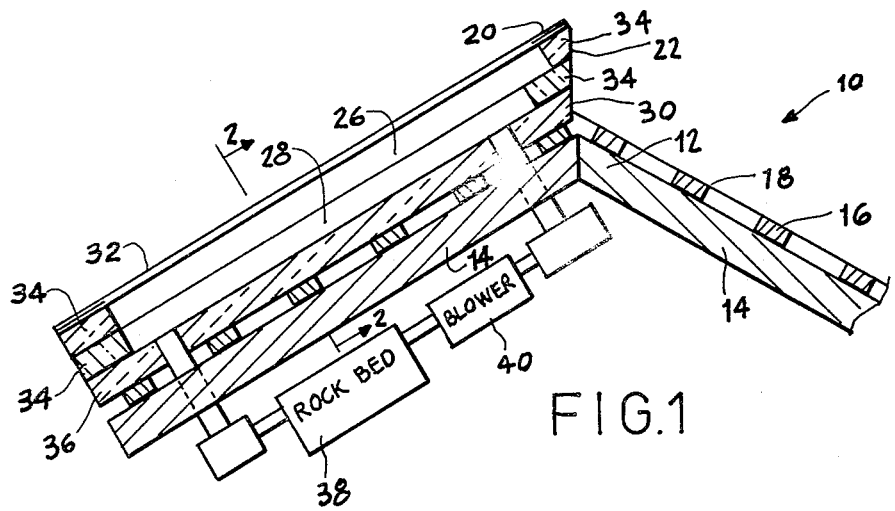
FIG. 1 is a schematic end view of a peaked roof for a house using a solar collection panel constructed in accordance with the present invention.

As mentioned, the present invention is an improvement on panel elements or members capable of being used in the solar heating system disclosed in U.S. Pat. No. 4,076,013. Reference is made to that patent for a complete and detailed description of the principles of operation of the solar heating system 10, which is schematically shown in FIG. 1 of the drawings herein. That solar heating system is particularly adapted for use in a conventional building structure such as a house. As seen therein, the peaked roof 12 of the house is formed with angularly related rafters or beam elements 14 on which transverse purlins 16 are secured in a conventional manner. On the north side of a building a conventional roof 18 is provided whereas on the south side of a building a solar heating panel 20, constructed in accordance with the present invention, is secured to the purlins 16.

In the illustrative embodiment, the solar heating panel is formed with upper and lower layers 22, 24 respectively, of panel elements or channel members shaped in accordance with the present invention. These panel members provide air chambers 26, 28 in the panel. Lower layer 24 is fully insulated with a layer 30 of conventional heat insulating material. The supply of heat insulating material may be contained in a third layer of channel members, if desired, as described in the above-mentioned patent.

The panel elements in upper layer 22 are closed by a glazing or skin 32 of translucent material, such as is sold under the trademark LEXAN, with the ends of the channels being closed by insulating material 34 whereby the enclosed chamber or channels 26 are defined.

Likewise the ends of chambers 28 are also closed with heat insulating material 34, to prevent heat loss from their ends. However, these chambers 28 are connected through a conventional air ducting system 36 to a heat storage bed 38. A blower 40 is provided to circulate air through channels 28 in layer 24, ducts 36, rock bed 38, and thence back to the chambers 28. The heat stored in the rock bed is used to heat air supplied to the interior of the structure.

Figure 2:
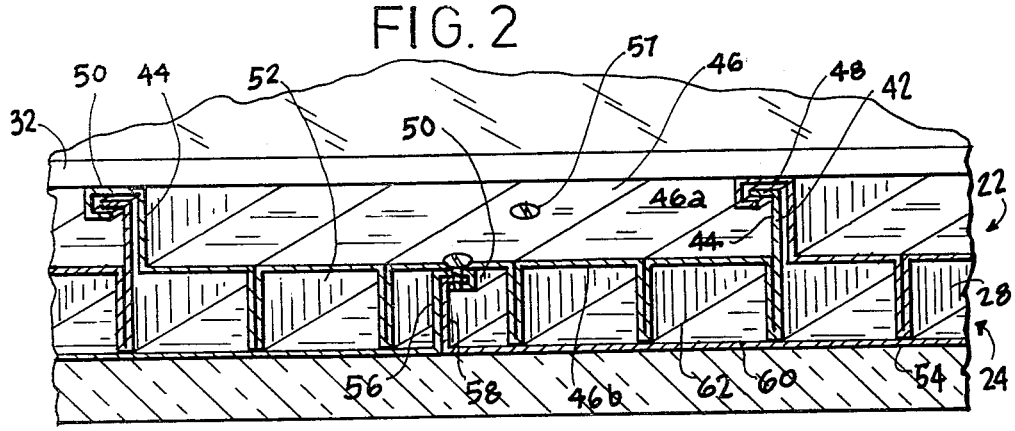
FIG. 2 is a partial perspective view, in section, of the panel construction shown in FIG. 1, taken along line 2—2 of FIG. 1.

In accordance with the present invention the panel or channel members used to form layers 22, 24 have an improved construction which provides additional strength to the panel and improved heat transfer capacity between the chambers 26 and 28. Referring to FIG. 2 of the drawing, the panels 42 which form upper layer 22 of the solar heating panel are generally U-shaped and have legs 44 extending upwardly towards glaxing 32 and a bight portion 46 therebetween. The bight portion has an upper surface 46a and lower or inner surface 46b facing chambers 28 defined in lower layer 24. One of legs 44 in each panel member 46 has an inwardly turned flange 48 formed thereon while the other of the legs has a channel 50 formed in it. This construction enables the flange 48 of one panel to be slidingly engaged or snapped into channel 50 on an adjacent panel. After the panel elements are positioned in alignment with each other channel edges 50 is crimped, by a conventional crimping device, to secure the panel elements together and form a single panel layer.

The bight portion of panel elements 42 are formed in a conventional sheet metal bending operation to provide a plurality of spaced downwardly extending flanges or fins 52 across the width of the panel member. These fins extend longitudinally along the entire length of the panel member and are dimensioned to be received within and to contact the panel members in layer 24.

Layer 24 of solar heating panel 10 is also formed from a plurality of generally U-shaped panel elements. These lower panel elements 54 also have a pair of spaced upwardly extending legs 56, 58 formed thereon. The height of these legs, however, is approximately the same as the height of fins 52 formed in the panel members of the upper layer. Legs 56, 58 are also formed so that one leg has an inwardly turned flange and the other leg has a channel member adapted to receive the flange so that the channel members can be crimped after the panel elements are aligned to secure the panel elements together. By this arrangement, the bight portions of layer 22 will rest on and be supported by the flanges of legs 56, 58 as seen in FIG. 2. If desired, sheet metal screws 57 may be used to secure the panels of layer 22 to the flanges of layer 24 thus to strengthen and reinforce the entire panel assembly.

As mentioned, fins 52 on the panel elements of the upper layer depend downwardly and rest on bight portions 60 of panel elements 54 of lower layer 24. These fins form small channels 28 therebetween along the length of the lower panels through which air circulated by blower 40 passes. In passing through these channels the air is heated by conduction and convection from the heated surfaces of panel elements 44 in upper layer 22. More specifically, the air contained in chambers 26 of the upper panel layer is heated by solar heating in accordance with known principles, and that heat is transferred to the material of panel elements 44 by conduction. The heat is transferred to the air passing in chambers 28 by conduction. Because of the fins 52, more heat is distributed to the air in chambers 28, with the result that the air used to heat rock bed 38 is raised to a higher temperature and a greater amount of the heat absorbed from the sun is stored.

Figure 2B:
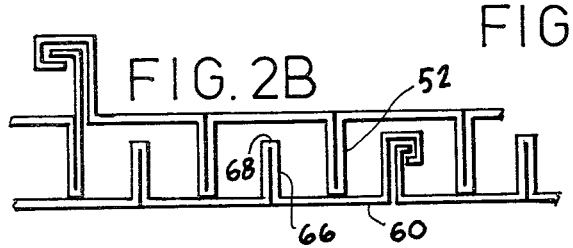
FIG. 2b is an elevational view, similar to FIG. 2, of another embodiment of the invention.
Figure 2A:
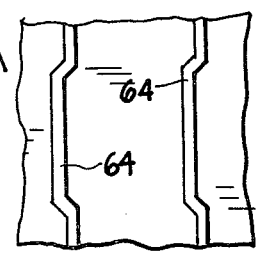
FIG. 2a is a bottom view of the edges for the upper layer panel members in FIG. 1.

It has been found that by increasing the amount of turbulence in chambers 28, the amount of heat transfer from the upper panels to the air in passages 28 can be further increased. In accordance with another aspect of the invention lower edges 62 of fins 52 are crimped laterally, as shown in FIGS. 2 and 2a at 64, to produce air turbulence deformations in the fins. As a result, air passing in chambers 28 will flow over these deformations and be disturbed, producing a wiping action within chambers 28 and increasing the amount of heat absorbed by the air. Alternatively, the lower edges 62 of fins 52 may be cut and the cut edges bent outwardly away from the flange to produce the desired turbulence.

In the embodiment of the invention illustrated in FIG. 2 bight portions 60 of lower panel elements 54 is flat. In another embodiment of the invention, however, bight portion 60 of these panel elements may be bent or folded to form upwardly extending fins 66, as seen in FIG. 2b. These fins have a height which is less than the height of fins 52 of the upper panel elements, and thus project only part way upwardly into chambers 28. The fins serve to restrict the width of the channels, and increase the amount of turbulence in the air flowing through these passages. It has been found that with narrower passages, increased turbulence is produced and increased heat transfer occurs. In addition, if desired, to further increase the turbulence of air flowing in chambers 28, the upper edges 68 of fins 66 may also be bent or crimped, to provide air turbulence creating deformations therein.

Figure 3:
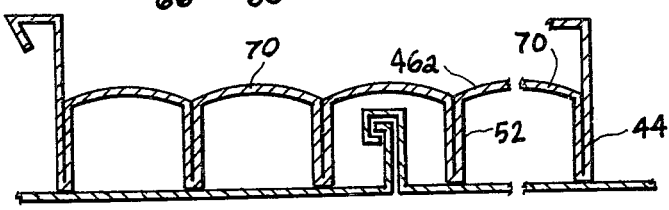
FIGS. 3, 4 and 5 are elevational view similar to FIG. 2b of other cross-sectional configurations suitable for use in the panels of the upper layer of the solar collector.

Yet another embodiment of the invention is illustrated in FIG. 3. In this embodiment panel members 44 are formed to have nonplanar surfaces 70 between flanges 52 in the bight portion of the panel. It has been found that these nonplanar surfaces will cause improved heat absorbtion in air contained in chambers 26 since less of the solar heat is reflected out of the panel by these nonplanar surfaces as compared to the flat surfaces of the embodiment of FIG. 2, even though these surfaces are coated with nonreflective paints.

Figure 4:
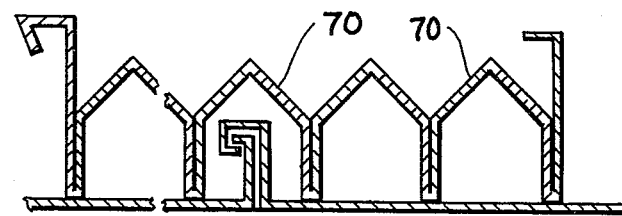

In the illustrative embodiment shown in FIG. 3 the nonplanar surfaces between fins 52 are convex on the outer surface 46a of the panel. In the embodiment of the invention illustrated in FIG. 4 nonplanar surfaces 70 are flat but angularly related to each other.

Figure 5:
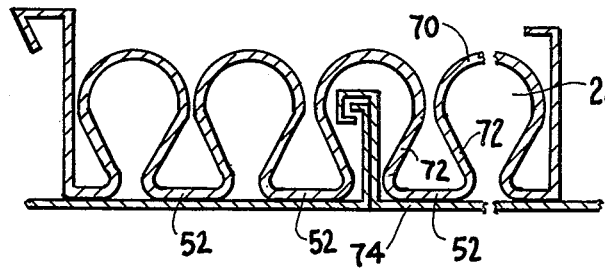

In yet another embodiment of the invention illustrated in FIG. 5, nonplanar surfaces 70 are curved and convex on the outer side of the panel's bight portion, but in addition fins 52' in this embodiment are also curved and spaced from each other. In particular, the folds in the panel's bight used to form fins 52' are curved or angled with respect to each other in areas 72 shown in the drawing, to provide flat base portions 74 for the fins. As a result of this construction air chambers 28 in the panel have a generally circular cross-section. It has been found that with this type of cross-section increased air turbulence is produced for the air flowing through chambers 28. Indeed, it is believed that the air will flow in a spiral or cork-screw manner through these chambers continuously wiping the air and increasing the volume of the air which actually contacts the inner surfaces of the panel member to absorb heat therefrom. This turbulence overcomes the tendency of air flowing in smooth channels to produce laminar air flow along the surface of the panel, which would otherwise restrict heat transfer.

While the panel elements of the present invention and their respective components or fins may be formed in any desirable height dimensions, it has been found that fins 52 having a height dimension of between $\frac{3}{4}$ and $1\frac{1}{2}$ inches provide satisfactory heat transfer capacity and strength for the panel members.

Figure 6:
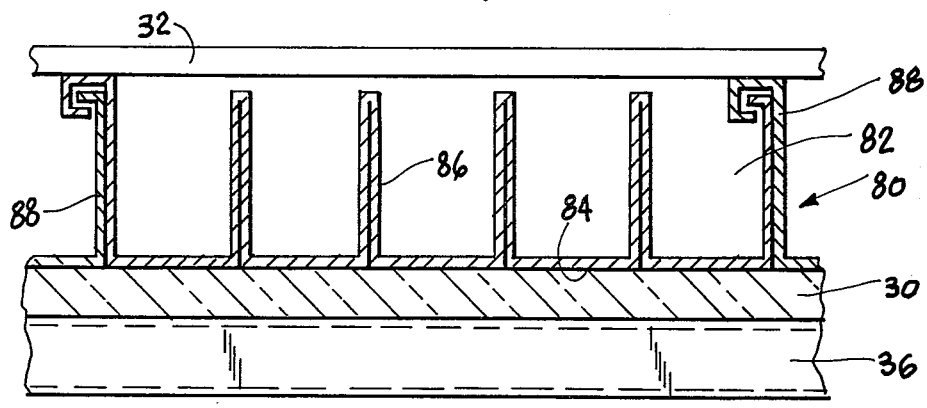
FIG. 6 is a sectional view similar to FIGS. 3–5 of another embodiment of the invention utilizing a single layer of panels.

Yet another embodiment of the invention is illustrated in FIG. 6. In this embodiment a single layer 80 of panel members is used to form the solar heating panel. In this case panel elements 80 define chambers 82 connected to air duct system 36 so that air circulating between the rock bed and the solar heating panel passes directly beneath and in contact with glazing 32. With this arrangement solar heat is absorbed directly by air flowing through the air duct system. To improve heat transfer, however, and to strengthen the panel, bight portion 84 of panel elements 80 are bent or folded to define fins 86 extending along the length of the panel. These fins have a height which is less than the height of legs 88 of the panel, so that air flowing in chambers 82 can pass over the fins from one channel to another, as an aid to increasing turbulence in the air flow. in addition, the upper edges of fins 86 may be deformed to create air turbulence deformations.

Figure 7:
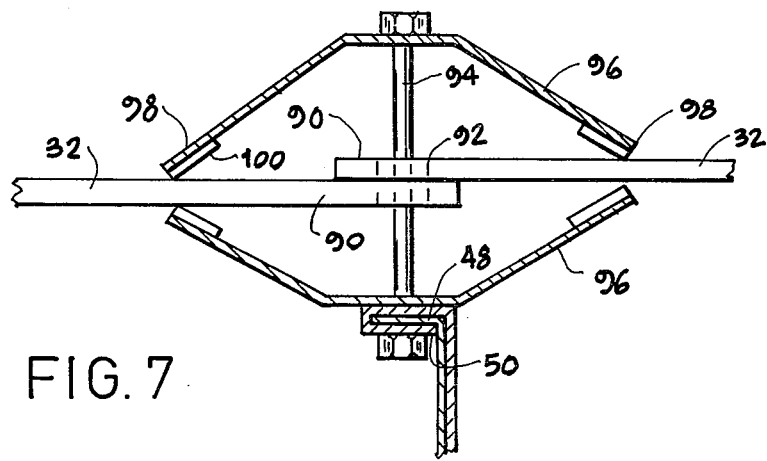
FIG. 7 is a sectional view of a joint used between adjacent glazing sheets in the solar heating panel of the invention.

FIG. 7 illustrates a joint used to connect the edges of glazing panels 32. Typically the solar heating panel of the present invention will have a substantial width, in order to collect sufficient solar energy to heat a private home. Thus, the glazing elements 32 will be provided in sheets to be assembled at the site. In this embodiment of the invention edges 90 of glazing sheets 32 have a plurality of longitudinally spaced slots 92 formed therein. The edges of adjacent glazing sheets 32 are positioned in overlapped relationship with slots 92 aligned. Bolts 94 are positioned in apertures in flanges 48, 50 of adjacent panel elements and extend through slots 92 of glazing sheets 32. To provide a moisture tight seal at this joint, a pair of flexible metal or aluminum metal strips, such as for example may be formed of thin aluminum stock 96 having the configuration illustrated in FIG. 7, are provided on opposite sides of the glazing. Edges 98 of these strips have neoprene rubber strips 100 or the like adhered thereto positioned to engage the opposite faces of glazings 32 and form a water tight seal. Due to the generally bowed configuration of strips 96, tightening of bolt 94 will urge strips 100 tightly against the glazing to form the desired seal. Slots 92 in the glazings permit some relative movement between the glazing strips with respect to each other and to fixed bolts 94 as a result of thermal expansions and contractions.

Accordingly it is seen that an improved panel construction is provided which will serve to reinforce the panel elements of the solar heater and thus strengthen the solar heating panel itself, while also providing improved heat transfer capacity within the panel elements to make a far more efficient solar heating system.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A solar heating panel comprising at least two separately formed, superimposed layers of longitudinally extending channel shaped panel members, said layers each including a plurality of the panel members, said panel members each having a bight portion, a pair of spaced outwardly extending leg portions and an open channel between said leg portions, the panel members in the uppermost of said layers each including a plurality of spaced longitudinally extending fins formed in their bight portions extending downwardly into the open channels defined by the panel members of the lower layer, the leg portions of the panels in the lowermost of said layers being located below the bight portions of the panels of said upper layer, and at least one sheet of transparent material overlying said upper layer of panel members and being supported on the outwardly extending leg portions thereof, whereby air flowing in the channels of said lower layer, below said upper layer, absorbs heat collected from the sun in said upper layer, said fins aiding in transferring heat from said panel members in the upper layer to the panel members in the lower layer.

2. A solar heating panel as described in claim 1 wherein said fins extend to and engage the bight portions of the panel members of the lower layer, said fins having a height dimension greater than the height dimension of the legs of the panels in the lower layer whereby said legs of the panels in the lower layer remain below the bight portions of the panels in the upper layer.

3. A solar heating panel as defined in claim 1 wherein said bight portions of the panels in said upper layer are planar between said fins.

4. A solar heating panel as described in claim 1 wherein said bight portions of the panels in said upper layer are nonplanar between said fins.

5. A solar heating panel as defined in claim 4 wherein said nonplanar portions of the panel between said fins include a plurality of flat angularly related diverging and longitudinally extending sections.

6. A solar heating panel as defined in claim 4 wherein said nonplanar portions of the panel members between said fins are curved.

7. A solar heating panel as defined in claim 6 wherein said curved portions are outwardly convex.

8. A solar heating panel as defined in any one of claims 1–7 wherein said fins are flat longitudinally extending elements defined by folds formed in said panel members.

9. A solar heating panel as defined in claim 8 wherein said fins have free edges engaged with the panel members in the lower layer.

10. A solar heating panel as defined in claim 8 wherein said free edges of said fins have turbulence producing deformations formed therein.

11. A solar heating panel as defined in claim 6 wherein said fins are formed by bending the bight portion of the upper panel members whereby each fin comprises two bent sections of the panel member, said sections being spaced and angularly related to each other to define air flow channels therebetween beneath the nonplanar portions of the panel members' bight.

12. A solar heating panel as defined in claim 1 wherein said fins are between $\frac{3}{4}''$ and $1\frac{1}{2}''$ in height.

13. A solar heating panel as defined in any one of claims 1–6 wherein the panels in said lower layer have spaced longitudinally extending fins formed therein projecting upwardly towards the panels in said uppermost layer between the fins thereof, the fins of the panel members in the uppermost layer being longer than the fins in said lower layer.

14. A solar heating panel comprising at least two separately formed superimposed layers of longitudinally extending elongated generally channel shaped panel members, said layers each including a plurality of the panel members, said panel members each having a bight portion, a pair of spaced outwardly extending leg portions, and an open channel between said leg portions; the bight portions of each of said elongated generally channel shaped panel members of said upper layer having inner and outer faces, said spaced leg portions thereof extending away from said bight portions on the side thereof defining said outer face, said bight portions having a plurality of longitudinally extending spaced folds formed therein between said leg portions projecting away from the inner face of said bight on the side thereof opposite said leg portions and into the channels of said lower layer to define heat transfer and reinforcing fins in the panel members of said upper layer, the leg portions of the panels in the lower-most of said layers being located below the bight portions of the panels of said upper layer, and at least one sheet of transparent material overlying said upper layer of panel members and being supported on the outwardly extending leg portions thereof, whereby air flowing in the channels of said lower layer, below said upper layer, absorbs heat collected from the sun in said upper layer, said fins aiding in transferring heat from said panel members in the upper layer to the panel members in the lower layer.

15. A solar heating panel as defined in claim 14 wherein said bight portions of the panel members of said upper layers are planar between said fins.

16. A solar heating panel as defined in claim 14 wherein said bight portions of the panel members of said upper layer are nonplanar between said fins.

17. A solar heating panel as defined in claim 16 wherein said nonplanar portions of the panel members of said upper layer between said fins include a plurality of flat angularly related longitudinally extending sections projecting from the panel member on the same side as said legs.

18. A solar heating panel as defined in claim 16 wherein said nonplanar portions of the panel member of said upper layer between said fins are curved.

19. A solar heating panel as defined in claim 18 wherein said curved portions are convex on said outer face.

20. A solar heating panel as defined in any one of claims 14-19 wherein said fins are flat longitudinally extending elements defined by folds formed in said bight.

21. A solar heating panel as defined in claim 20 wherein said fins have free edges including turbulence producing deformations formed therein.

22. A solar heating panel as defined in claim 20 wherein the folds in the panels defining said fins provide separate fin sections, said sections being spaced and angularly related to each other to define air flow channels therebetween beneath the nonplanar portions of the panel.

* * * * *